(12) United States Patent
Choi

(10) Patent No.: US 10,620,884 B2
(45) Date of Patent: Apr. 14, 2020

(54) CONTROLLER FOR MANAGING MAP DATA AND OPERATING METHOD THEREOF

(71) Applicant: SK hynix Inc., Gyeonggi-do (KR)

(72) Inventor: Hyoung-Pil Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/150,613

(22) Filed: Oct. 3, 2018

(65) Prior Publication Data

US 2019/0278526 A1 Sep. 12, 2019

(30) Foreign Application Priority Data

Mar. 12, 2018 (KR) .................. 10-2018-0028717

(51) Int. Cl.
*G06F 3/06* (2006.01)
*G06F 12/02* (2006.01)

(52) U.S. Cl.
CPC .......... *G06F 3/0688* (2013.01); *G06F 3/0626* (2013.01); *G06F 12/0246* (2013.01)

(58) Field of Classification Search
CPC .. G06F 3/0626; G06F 3/30629; G06F 3/0638; G06F 3/0688; G06F 12/0246
See application file for complete search history.

(56) References Cited

U.S. PATENT DOCUMENTS

2010/0070729 A1* 3/2010 Ng .................... G06F 3/0617
711/166

FOREIGN PATENT DOCUMENTS

KR 1020170021557 2/2017

* cited by examiner

*Primary Examiner* — Aracelis Ruiz
(74) *Attorney, Agent, or Firm* — IP & T Group LLP

(57) ABSTRACT

A controller includes a processor suitable for controlling a memory device to write normal map data and sequential map data; and a map data manager suitable for generating and storing a normal map table and a sequential map table, wherein the map data manager, when normal user data is sequential user data, sequentially records the normal map data in the normal map table, merges the normal map data in units, each of a size of a write segment, to generate the sequential map data when a size of the recorded normal map data is greater than the size of the write segment, and records the sequential map data in the sequential map table.

19 Claims, 12 Drawing Sheets

CONTROLLER FOR MANAGING MAP DATA AND OPERATING METHOD THEREOF

CROSS-REFERENCE TO RELATED APPLICATION

The present application claims priority under 35 U.S.C. § 119(a) to Korean Patent Application No. 10-2018-0028717, filed on Mar. 12, 2018, the disclosure of which is incorporated herein by reference in its entirety.

BACKGROUND

1. Field

Various embodiments of the present invention relate to a controller. Particularly, embodiments relate to a controller capable of efficiently managing data, and an operating method thereof.

2. Description of the Related Art

The paradigm for computing environments continues to move toward ubiquitous computing which provides people or users with the ability to use their, or commonly supplied computing systems, anytime anywhere. In the era of ubiquitous computing, the demand for portable electronic devices, such as mobile phones, digital cameras and laptop computers are soaring. Those electronic devices generally include a memory system using a memory device as a data storage device. The data storage device may be used as a main memory or an auxiliary memory of a portable electronic device.

Since the data storage device does not have a mechanical driving unit (e.g., a mechanical arm with a read/write head) as compared with a hard disk device, it may have excellent stability and durability. Also, the data storage device can have a quick data access rate with low power consumption compared with the hard disk device. Some examples of a data storage device having such advantages include Universal Serial Bus (USB) memory devices, memory cards of diverse interfaces, Solid-State Drives (SSD) and the like.

SUMMARY

Various embodiments of the present invention are directed to a controller capable of managing efficiently map data corresponding to sequential user data.

In accordance with an embodiment of the present invention, a controller may include: a processor suitable for controlling a memory device to write normal map data and sequential map data; and a map data manager suitable for generating and storing a normal map table and a sequential map table, wherein the map data manager, when normal user data is sequential user data, sequentially records the normal map data in the normal map table, merges the normal map data in units, each of a size of a write segment, to generate the sequential map data when a size of the recorded normal map data is greater than the size of the write segment, and records the sequential map data in the sequential map table, and wherein the normal map table represents a mapping relationship between the normal user data and the normal map data corresponding to the normal user data, and the sequential map table represents a mapping relationship between the sequential user data and the sequential map data corresponding to the sequential user data.

In accordance with an embodiment of the present invention, an operating method of controller may include: controlling a memory device to write a normal map data and a sequential map data to the memory device; and managing the normal map table and the sequential map table, wherein, when normal user data is sequential user data, the managing of the normal map table and the sequential map table comprises: sequentially recording normal map data in the normal map table; merging the normal map data in units, each of a size of a write segment, to generate sequential map data when a size of the recorded normal map data is greater than the size of the write segment; and recording the sequential map data in the sequential map table, wherein the normal map table represents a mapping relationship between the normal user data and the normal map data corresponding to the normal user data, and the sequential map table represents a mapping relationship between the sequential user data and the sequential map data corresponding to the sequential user data.

In accordance with an embodiment of the present invention, a controller may include: a processor; and a map data manager suitable for operating with the processor to generate and store normal user data in association with corresponding normal map data, and generating and storing sequential user data in association with corresponding sequential map data, wherein the map data manager identifies normal map data that is sequential, and merges the sequential normal map data in units, each of a size of a write segment, to generate the sequential map data, when a size of the recorded normal map data is greater than the size of the write segment.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
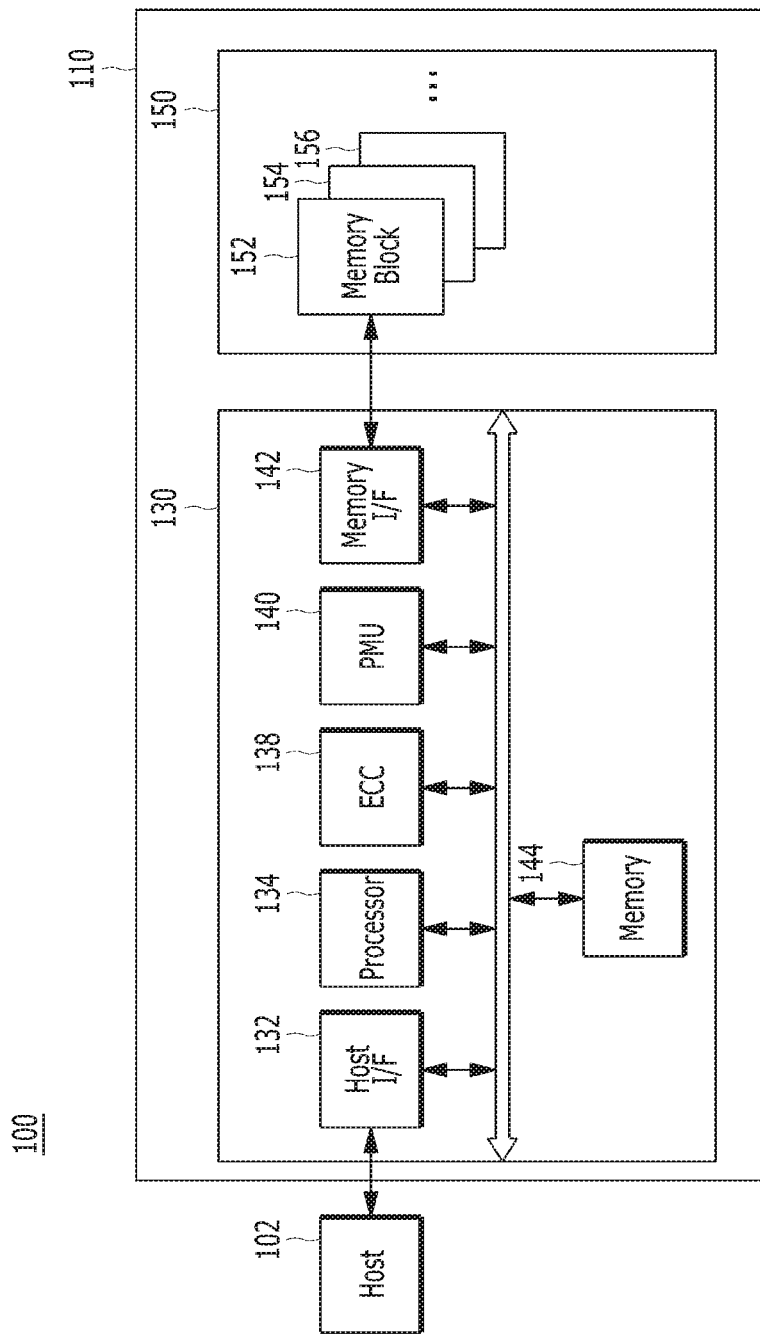
FIG. 1 is a block diagram illustrating a data processing system including a memory system in accordance with an example of the disclosure.

Various examples of the disclosure are described below in more detail with reference to the accompanying drawings.

Elements and features of the disclosure may be configured or arranged differently than shown and described herein. Thus, the present invention is not limited to the embodiments set forth herein. Rather, the described embodiments are provided so that this disclosure is thorough and complete and fully conveys the scope of the disclosure to those skilled in the art to which this invention pertains. Throughout the disclosure, like reference numerals refer to like parts throughout the various figures and examples of the disclosure. Also, throughout the specification, reference to "an embodiment," "another embodiment," or the like is not necessarily to only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element described below could also be termed as a second or third element without departing from the spirit and scope of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments and is not intended to be limiting of the present invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include, for example, a portable electronic device such as a mobile phone, an MP3 player and a laptop computer or an electronic device such as a desktop computer, a game player, a TV, a projector, and the like.

The memory system 110 may operate or perform a specific function or operation in response to a request from the host 102 and may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static RAM (SRAM) and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM) and a flash memory.

The memory system 110 may include a memory device 150 which stores data to be accessed by the host 102, and a controller 130 which may control storage of data in the memory device 150.

The controller 130 and the memory device 150 may be integrated into a single semiconductor device, which may be included in the various types of memory systems as exemplified above.

The memory system 110 may be configured as a part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, and provide data stored therein to the host 102 through a read operation. The memory device 150 may include a plurality of memory blocks 152 to 156, each of which may include a plurality of pages. Each of the plurality of pages may include a plurality of memory cells to which a plurality of word lines (WL) are electrically coupled.

The controller 130 may control overall operations of the memory device 150, such as read, write, program and erase operations. The controller 130 may control the memory device 150 in response to a request from the host 102. The controller 130 may provide the data, read from the memory device 150, to the host 102, and/or may store the data, provided by the host 102, into the memory device 150.

The controller 130 may include a host interface (I/F) 132, a processor 134, an error correction code component (ECC) 138, a power manager (PMU) 140, a memory device controller such as a memory interface (I/F) 142, a memory 144 and a ROM 146 all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (DATA), small computer system interface (SCSI), enhanced small disk interface (ESDI), and integrated drive electronics (IDE).

The ECC 138 may detect and correct errors in the data read from the memory device 150 during the read operation. When the number of error bits is greater than or equal to a threshold number of correctable error bits, the ECC 138 may not correct error bits but may instead output an error correction fail signal indicating failure in correcting the error bits.

The ECC 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC 138 may include suitable circuits, modules, systems and/or devices for performing the error correction operation based on at least one of the above described codes.

The PMU 140 may provide and manage power of the controller 130.

The memory interface 142 may serve as an interface for handling commands and data transferred between the controller 130 and the memory device 150, so as to allow the controller 130 to control the memory device 150 in response to a request delivered from the host 102. The memory interface 142 may generate a control signal for the memory device 150 and may process data entered into or outputted from the memory device 150 under the control of the processor 134, in a case when the memory device 150 is a flash memory and, in particular, when the memory device 150 is a NAND flash memory.

The memory 144 may serve as a working memory of the memory system 110 and the controller 130, and may store temporary or transactional data for operating or driving the memory system 110 and the controller 130. The controller 130 may control the memory device 150 in response to a request from the host 102. The controller 130 may deliver data read from the memory device 150 into the host 102, may store data entered through the host 102 within the memory device 150. The memory 144 may be used to store data required for the controller 130 and the memory device 150 in order to perform these operations.

The memory 144 may be implemented with a volatile memory. The memory 144 may be implemented with a static random access memory (SRAM) or a dynamic random access memory (DRAM). Although FIG. 1 shows the memory 144 disposed within the controller 130, the disclosure is not limited thereto. That is, the memory 144 may be located within or external to the controller 130. For instance, the memory 144 may be embodied by an external volatile memory having a memory interface for transferring data and/or signals transferred between the memory 144 and the controller 130.

The ROM 146 is a read only memory and may include a nonvolatile memory in which information is retained although power is off. For example, the ROM 146 may store a plurality of ROM codes. The ROM codes may include codes for executing firmware and are less likely to be corrected after packaging.

The processor 134 may control the overall operations of the memory system 110. The processor 134 may drive or execute a firmware to control the overall operations of the memory system 110. The firmware may be referred to as a flash translation layer (FTL).

A FTL may perform an operation as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may store map data. Therefore, the controller 130 may map a logical address, which is provided from the host 102, to a physical address of the memory device 150 through the map data. The memory device 150 may perform an operation like a general device because of the address mapping operation. Also, through the address mapping operation based on the map data, when the controller 130 updates data of a particular page, the controller 130 may program new data on another empty page and may invalidate old data of the particular page due to a characteristic of a flash memory device. Further, the controller 130 may store map data of the new data into the FTL.

The processor 134 may be implemented with a microprocessor or a central processing unit (CPU). The memory system 110 may include one or more processors 134.

A manager (not shown) may be included in the processor 134. The manager may perform bad block management of the memory device 150. The manager may find bad memory blocks in the memory device 150, which are blocks in unsatisfactory condition for further use, as well as manage the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 100, and thus reliable bad block management helps restore these attributes.

Figure 2:
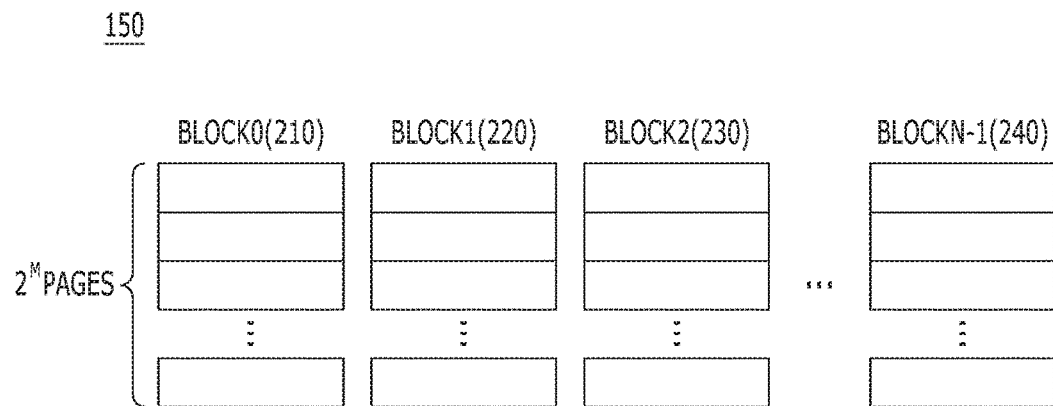
FIG. 2 is a schematic diagram illustrating an exemplary configuration of a memory device of the memory system shown in FIG. 1.

FIG. 2 is a schematic diagram illustrating the memory device 150.

Referring to FIG. 2, the memory device 150 may include the plurality of memory blocks, i.e., BLOCK0 (210), BLOCK1 (220), BLOCK2 (230) . . . , and BLOCKN−1 (240), and each of these blocks may include a plurality of pages, for example, $2^M$ pages, the number of which may vary according to circuit design. The memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Figure 3:
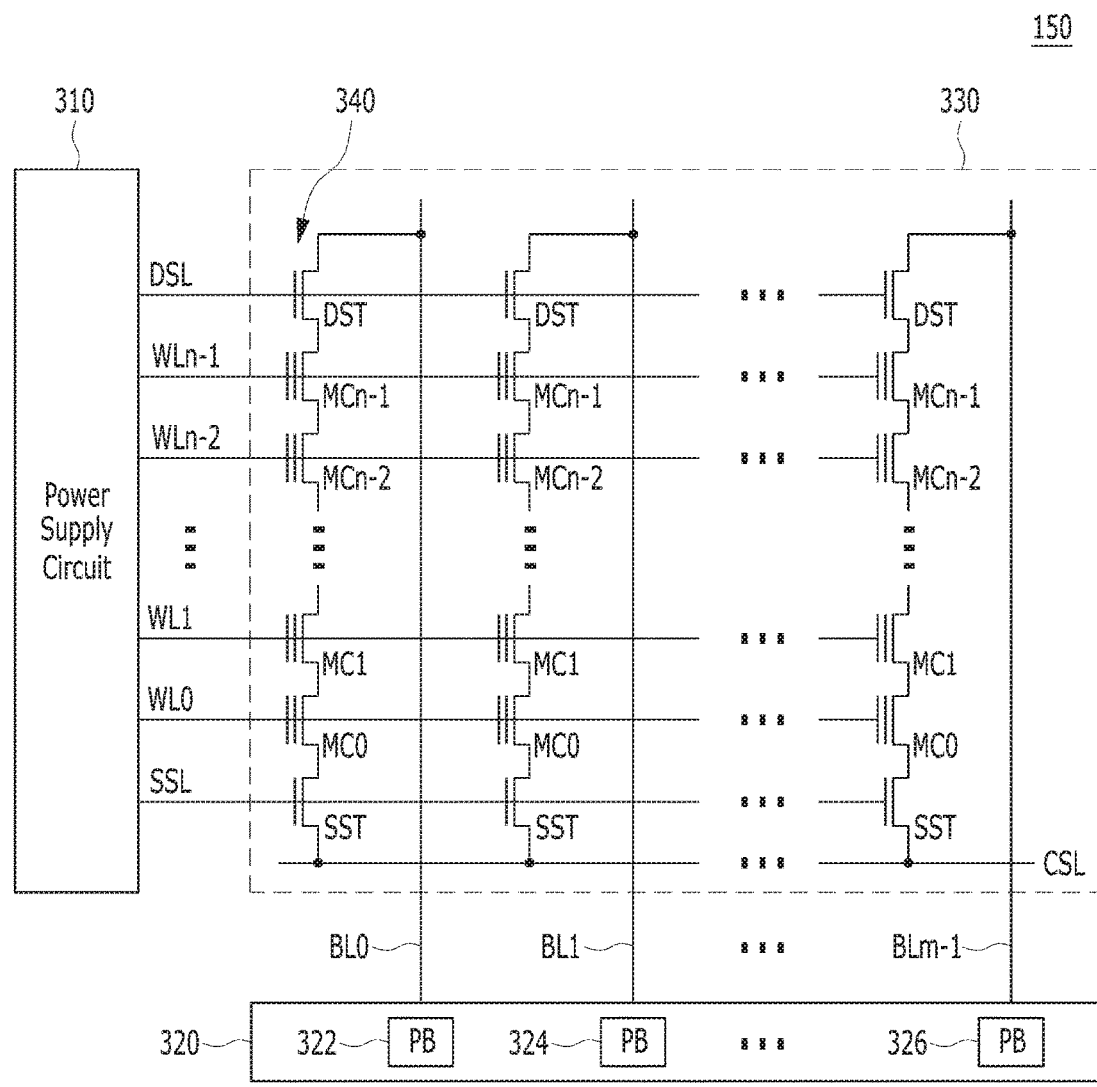
FIG. 3 is a circuit diagram illustrating an exemplary configuration of a memory cell array of a memory block in the memory device shown in FIG. 2.

FIG. 3 is a circuit diagram illustrating a memory block 330 in the memory device 150.

Referring to FIG. 3, the memory block 330 may correspond to any of the plurality of memory blocks 152 to 156.

Referring to FIG. 3, the memory block 330 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by single level cells (SLC) each of which may store 1 bit of information, or by multi-level cells (MLC) each of which may store data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 shows, as an example only, that the memory block 330 is constituted with NAND flash memory cells, it is noted that the memory block 330 of the memory device 150 is not limited to a NAND flash memory. The memory block 330 may be realized by a NOR flash memory, a hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A power supply circuit 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The power supply circuit 310 may perform a voltage generating operation under the control of a control circuit (not shown). The power supply circuit 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification operation or a normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
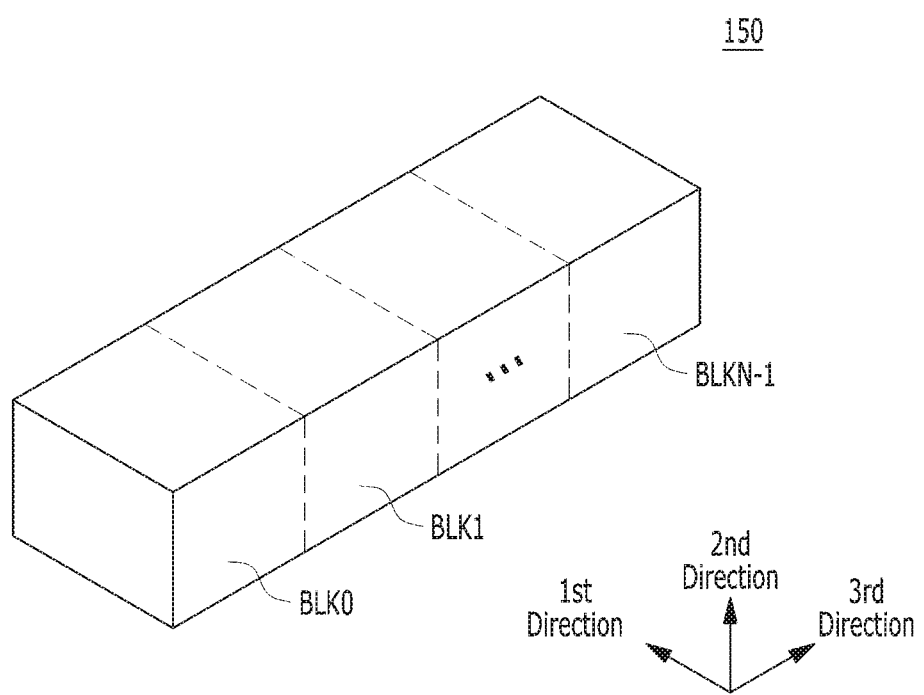
FIG. 4 is a schematic diagram illustrating an exemplary three-dimensional structure of the memory device shown in FIG. 2.

FIG. 4 is a schematic diagram illustrating a 3D structure of the memory device 150.

The memory device 150 may be embodied by a 2D or 3D memory device. Specifically, as illustrated in FIG. 4, the memory device 150 may be configured with a 3D stack structure. When the memory device 150 has a 3D structure, the memory device 150 may include a plurality of memory blocks BLK0 to BLKN−1 each having a 3D structure (or a vertical structure).

Referring back to FIG. 1, the controller may control the memory device to store user data therein. In addition, the controller may store address information corresponding to the user data, e.g., map data, and control the memory device to periodically store the map data therein. The controller may manage the map data in the map table. When the host requests to read the user data, the controller may search a location of the user data corresponding to the request of the host based on the map table, and output user data found in the search to the host. The map data may be used to efficiently perform such a read operation of the controller.

Since the controller periodically stores the map data in the memory device, a physical space for the map data is secured within the memory device. In other words, since the map data is stored in the memory device for read performance and a smooth FTL operation of the controller, a storage space of the memory device may be wasted. Accordingly, the controller efficiently stores the map data in the memory device so that the read performance of the controller and the storage space of the memory device may be efficiently utilized.

The controller 130 may efficiently store target map data corresponding to target data in the memory device 150. Specifically, when the host 102 requests to write sequential data to the memory system 110, the controller 130 may control the memory device 150 to successively program the sequential data into the memory device 150. In other words, the sequential data may be stored in the memory device 150 according to an order that the data originally has. When the controller 130 generates map data for the sequential data using such a property, the controller 130 may generate the map data by reflecting continuity. The map data may include address information of the memory device 150 in which user data corresponding to the map data is stored.

The controller 130 in accordance with an embodiment of the present invention is described in detail with reference to FIGS. 5 to 7.

Figure 5:
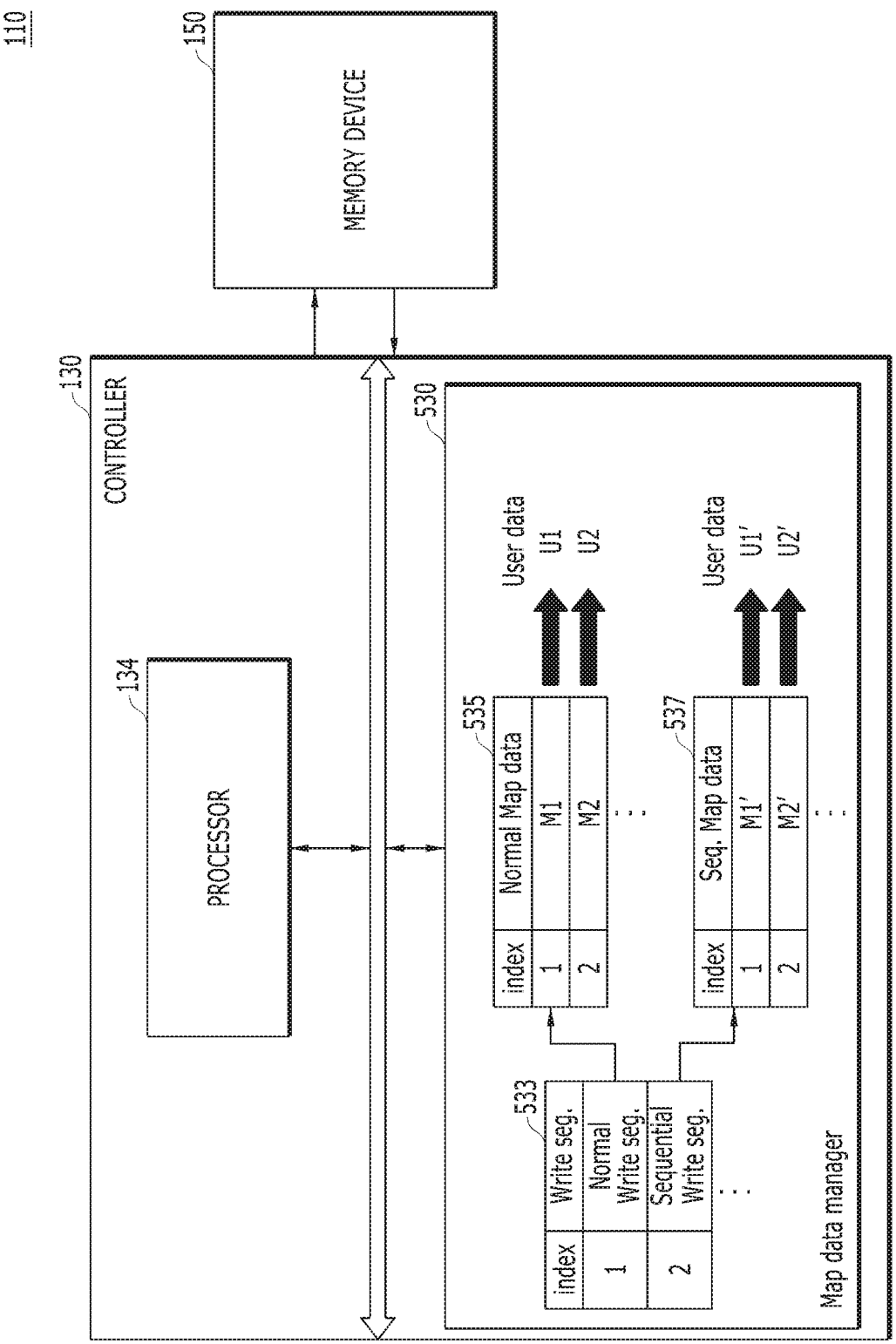
FIG. 5 is a block diagram schematically illustrating a structure of the memory system in accordance with an example of the disclosure.

FIG. 5 is a block diagram schematically illustrating a structure of the memory system 110 in accordance with an embodiment of the present invention.

As described with respect to FIG. 1, the memory system 110 may include the controller 130 and the memory device 150. Referring to FIG. 5, the controller 130 may include a map data manager 530 in addition to the processor 134. By way of example, it is assumed that the host 102 issues a write command for target data.

The map data manager 530 may generate and store map data corresponding to the target data. It is assumed that a write segment may include 2048 pieces of map data. In addition, it is assumed that a size of the write segment is 8 KB, a size of normal user data corresponding to normal map data is 4 KB, and a size of sequential user data corresponding to sequential map data is 8 MB. Furthermore, it is assumed that a size of a normal write segment and a size of a sequential write segment are each 8 KB. These sizes are exemplary; the present invention is not limited thereto.

The map data manager 530 may generate a write segment table 533 which includes the normal write segment and the sequential write segment. The normal write segment may correspond to a normal map table 535 in which the normal map data is composed of write segment units, each of which is a predetermined size. In the same manner, the sequential write segment may correspond to a sequential map table 537 in which the sequential map data is composed of write segment units, each of which is a predetermined size.

The map data manager 530 may generate the normal map table 535 representing a mapping relationship between the normal map data and the normal user data. The normal map table 535 may be composed of a single write segment unit. Accordingly, the normal map table 535 may include 2048 pieces of normal map data. As assumed above, since the user data corresponding to one normal map data is 4 KB, 8 KB of the normal write segment may represent mapping information of 8 KB of the user data. This is merely an example; the present invention is not limited thereto. Accordingly, the normal map table 535 may include 4096 pieces of normal map data. In this case, 16 KB of the normal write segment may represent mapping information of 16 MB of the user data.

For example, the map data manager 530 may divide the normal user data, sequentially inputted by 4 KB units, to generate the normal map table 535 representing the mapping relationship between the normal user data and the normal map data corresponding to the normal user data.

When the normal user data sequentially inputted is the sequential user data, the map data manager 530 may merge the normal map data corresponding to the normal user data to the size of the normal write segment to generate the sequential map data. For example, when the size of the normal write segment is 8 KB, the normal map table 535 may include 2048 pieces of normal map data, and the map data manager 530 may merge the 2048 pieces of normal map data into one piece of sequential map data. The sequential map data may include information on a start address of the normal map data. The map data manager 530 may recognize start and end addresses of the sequential map data based on the information on the start address of the normal map data and the size of the write segment.

The normal map table 535 including the mapping information of the merged normal map data may automatically dissipate.

The map data manager 530 may generate the sequential map table 537 representing a mapping relationship between the sequential map data and the sequential user data. The sequential map table 537 may be composed of a single sequential write segment unit. A size of the sequential write segment may be the same as the size of the normal write segment. The sequential map table 537 may include 2048 pieces of sequential map data. Accordingly, the sequential write segment may correspond to 16 GB of the user data. In other words, although the sizes of the normal write segment and sequential write segment are the same as 8 KB, a size of the normal user data corresponding to the normal write segment may be 8 MB, and a size of the sequential user data corresponding to the sequential write segment may be 16 GB.

The map data manager 530 may include a plurality of map tables for managing the map data having different sizes of write segments. For example, as described above, the map data manager 530 may include the normal map table and sequential map table corresponding to 8 KB of the write segment, and further include the normal map table and sequential map table corresponding to 16 KB of the write segment. This is merely an example, and the present invention is not limited thereto.

When the normal user data is random user data, the map data manager 530 may record the normal map data corresponding to the normal user data in the normal map table without merging.

When a size of the normal user data is smaller than a predetermined size of the write segment even though the normal user data is the sequential user data, the map data manager 530 may receive the normal user data to be processed without merging.

The processor 134 may control the memory device 150 to periodically flush the normal map data and the sequential map data in the memory device 150. Specifically, the processor 134 may control the memory device 150 to store the normal map data and the sequential map data in units of the normal write segment and sequential write segment in a meta region of the memory device 150. Although not illustrated, the memory device 150 may be divided into the meta region in which the normal map data and the sequential map data are stored and a user region in which the normal user data and the sequential user data are stored.

When the host 102 requests a read operation on the target data, the map data manager 530 may check whether the write segment including the target data is the normal write segment or the sequential write segment based on the write segment table 533. The write segment may correspond to a plurality of read segments. For example, 8 KB of the write segment may correspond to four read segments, each having a size of 2 KB.

When the target map data is included in the normal write segment, the map data manager 530 may search the normal map data recorded in the normal map table, and may load a normal read segment corresponding to the normal write segment and including the normal map data. In addition, the map data manager 530 may check a location of the target data based on the loaded normal read segment. Subsequently, the processor 134 may control the memory device 150 to read the target data at the location of the target data.

When the target map data is included in the sequential write segment, the map data manager 530 may search the sequential map data recorded in the sequential map table, and may load a sequential read segment corresponding to the sequential write segment and including the sequential map data. In addition, the map data manager 530 may check a location of the target data based on the loaded sequential read segment. Subsequently, the processor 134 may control the memory device 150 to read the target data at the location of the target data.

That is, in accordance with an embodiment of the present invention, the controller 130 may efficiently use space of the memory device 150, particularly the space in which the sequential write segment including the sequential map data is stored. In other words, the sequential write segment corresponding to 16 GB of the user data may occupy a relatively smaller meta region of the memory device 150 as compared with the normal write segment corresponding to 8 MB of the user data.

Figure 6A:
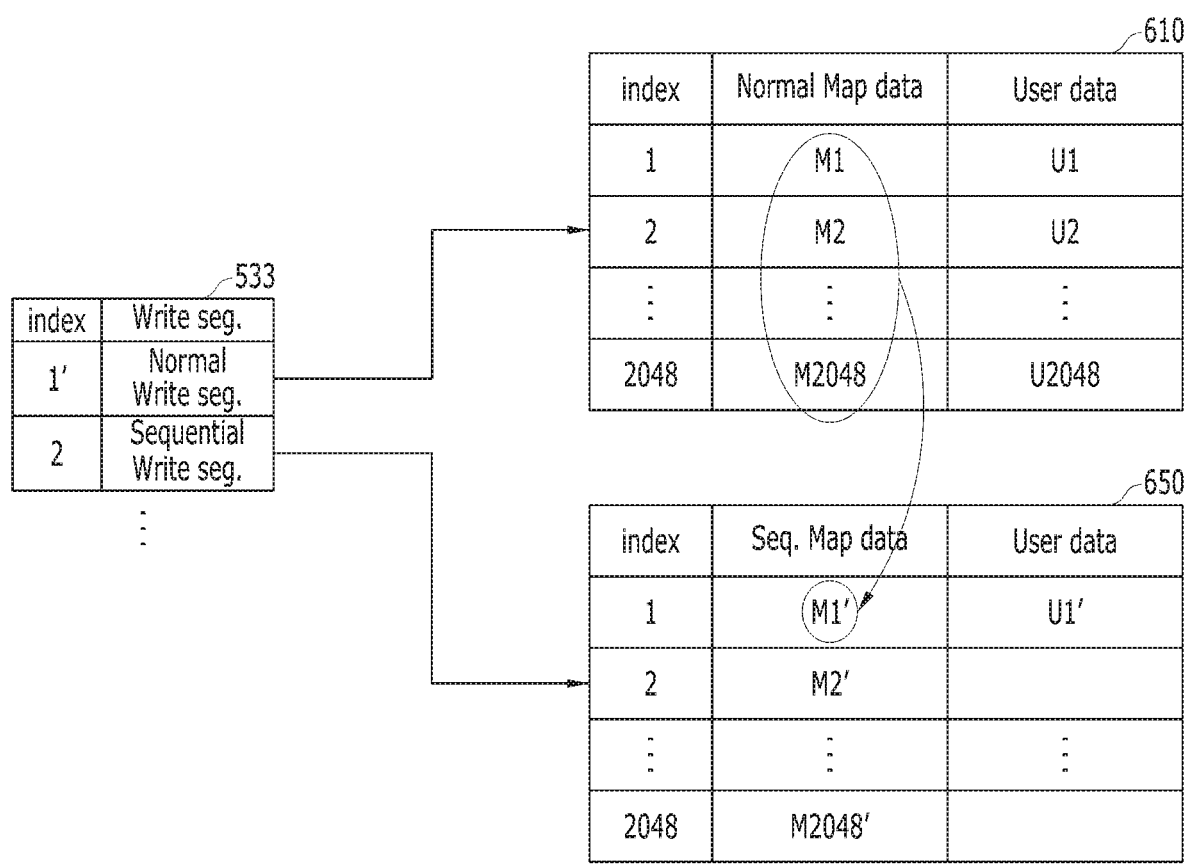
FIG. 6A is a diagram schematically illustrating a map table in accordance with an example of the disclosure.

FIG. 6A is a diagram schematically illustrating a map table in accordance with an embodiment of the present invention. Specifically, FIG. 6A shows an operation in which the map data manager 530 merges the normal map data to generate the sequential map data.

As described above, the map data manager 530 may record the normal write segment and the sequential write segment in the write segment table 533.

Referring to FIG. 6A, the normal write segment may correspond to a first normal map table 610 representing mapping information of the normal map data. For example, the first normal map table 610 may represent mapping information of 8 KB of map data and 8 MB of user data. The sequential write segment may correspond to the sequential map table 537 representing mapping information of the sequential map data. For example, a sequential map table 650 may represent mapping information of 8 KB of map data and 16 GB of user data. This is merely an example, and the present invention is not limited thereto.

When the normal map data recorded in the first normal map table 610 is the sequential map data, the map data manager 530 may merge normal map data M1 to M2048 to generate first sequential map data M1'. The first sequential map data M1' may be recorded in the sequential map table 650. The first normal map table 610 may automatically dissipate.

The first sequential map data M1' may include mapping information of the normal map data M1 to M2048. A plurality of normal user data U1 to U2048 having a total size of 8 MB corresponding to the normal map data recorded in the first normal map table 610 may be included in first user data U1' corresponding to the first sequential map data M1' recorded in the sequential map table 650.

Figure 6B:
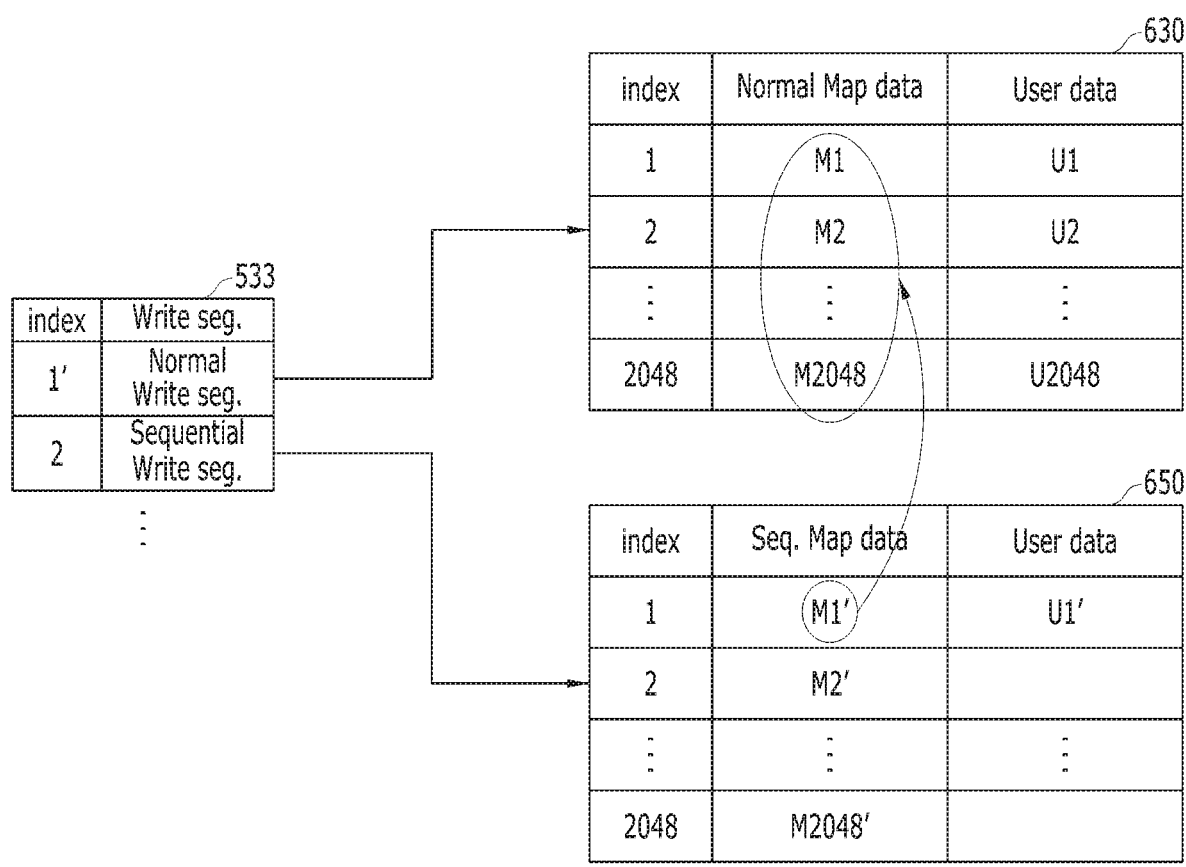
FIG. 6B is a diagram schematically illustrating a map table in accordance with another example of the disclosure.

FIG. 6B is a diagram schematically illustrating a map table in accordance with an embodiment of the present invention. FIG. 6B schematically illustrates an operation of the controller 130 when there is no continuity of the first sequential map data M1', which is different from arrangement of FIG. 6A. For example, when some of the normal map data M1 to M2048 included in the first sequential map data M1' is required to be updated, the continuity of the first sequential map data M1' may disappear.

The map data manager 530 may record the first sequential map data M1' in the sequential map table 650. The first sequential map data M1' may include the mapping information of the normal map data M1 to M2048 as described above. The host 102 may request to update some of the normal map data M1 to M2048 included in the first sequential map data M1'. In this case, the map data manager 530 may divide the first sequential map data M1' into the plurality of normal map data M1 to M2048. In other words, the map data manager 530 may divide the first sequential map data M1' into the plurality of normal map data M1 to M2048 to generate a second normal map table 630. In addition, the map data manager 530 may update the map data which is a target for being updated, based on the second normal map table 630 according to the request of the host 102. The map data manager 530 may record the normal write segment corresponding to the normal map table in the write segment table 533. When just the first sequential map data M1' is recorded in the sequential map table 650, the sequential map table 650 may automatically dissipate due to the division of the first sequential map data M1'.

That is, in accordance with an embodiment of the present invention, the controller 130 may merge and divide the sequential map data and record the merged and divided sequential map data in the normal map table or the sequential map table.

Figure 7:
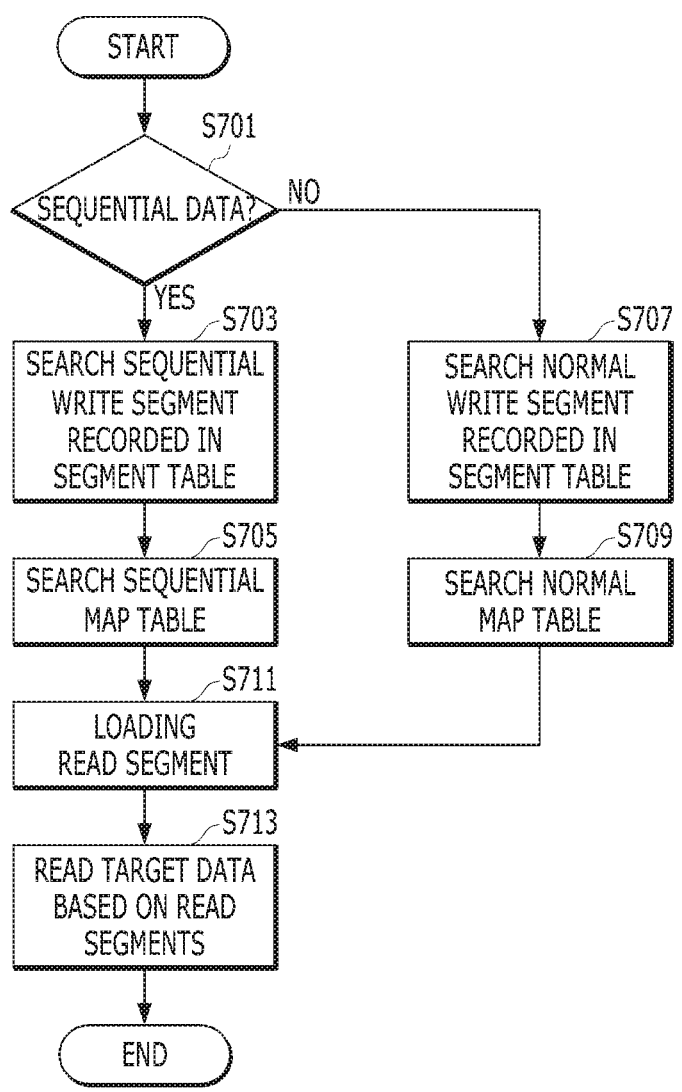
FIG. 7 is a flowchart illustrating an operation of the controller in accordance with an example of the disclosure.

FIG. 7 is a flowchart illustrating an operation of the controller 130 in accordance with an embodiment of the present invention. Specifically, FIG. 7 schematically illustrates the operation of the controller 130 to read target data according to a read request of the host 102.

In step S701, the map data manager 530 may determine whether or not the target data corresponding to the read request of the host 102 is sequential data.

When the target data is the sequential data (that is, "YES" in step S701), the map data manager 530 may search for the sequential write segment corresponding to the target map data, which is recorded in the write segment table 533, in step S703. Specifically, the map data manager 530 may search for the sequential write segment including the map data of the target data corresponding to the read request of the host 102 in the write segment table 533 which is set in advance.

In step S705, the map data manager 530 may search for a location of the target data in the sequential map table corresponding to the sequential write segment including the target map data.

When the target data is discontinuity data (that is, "NO" in step S701), the map data manager 530 may search for the normal write segment corresponding to the target map data, which is recorded in the write segment table 533, in step S707. Specifically, the map data manager 530 may search for the normal write segment including the map data of the target data corresponding to the read request in the write segment table 533 which is set in advance.

In step S709, the map data manager 530 may search for a location of the target data in the normal map table corresponding to the normal write segment including the target map data.

In step S711, the processor 134 may load the read segments based on the location of the target data identified in the search in step S709. Specifically, the processor 134 may load the read segments obtained by dividing the write segment based on a predetermined reference. For example, when it is assumed that the write segment is 8 KB as described above, the read segments may be 2 KB. Accordingly, a single write segment may include four read segments. In other words, the processor 134 may load the read segments including the location of the target data found in the search.

In step S713, the processor 134 may control the memory device 150 to read the target data based on the loaded read segments.

Thus, in accordance with the embodiments of the present invention, the controller 130 may efficiently store the map data for the sequential data, that is, the sequential map data, thereby minimizing a space in which the map data is stored. Accordingly, as the cost of loading and managing the map data is reduced, the read performance of the controller 130 may be improved. In addition, mapping information between the map data and the user data may be defined with a small amount of map data.

A data processing system and electronic devices, which may be constituted with the memory system 110 including the memory device 150 and the controller 130, which are described above by referring to FIGS. 1 to 7, will be described in detail with reference to FIGS. 8 to 16.

FIGS. 8 to 16 are diagrams schematically illustrating exemplary applications of the data processing system of FIGS. 1 to 7 according to various embodiments.

Figure 8:
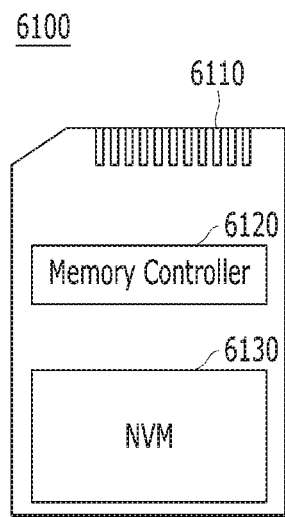
FIGS. 8 to 16 are diagrams schematically illustrating exemplary applications of a data processing system in accordance with various embodiments of the present invention.

FIG. 8 is a diagram schematically illustrating an example of the data processing system including the memory system in accordance with an embodiment. More specifically, FIG. 8 schematically illustrates a memory card system including the memory system.

Referring to FIG. 8, the memory card system 6100 may include a memory controller 6120, a memory device 6130 and a connector 6110.

More specifically, the memory controller 6120 may be connected to the memory device 6130, and may be configured to access the memory device 6130. The memory device 6130 may be embodied as a nonvolatile memory. By way of example but not limitation, the memory controller 6120 may be configured to control read, write, erase and background operations onto the memory device 6130. The memory controller 6120 may be configured to provide an interface between the memory device 6130 and a host and/or drive firmware for controlling the memory device 6130. That is, the memory controller 6120 may correspond to the controller 130 in the memory system 110 described with reference to FIGS. 1 to 7, while the memory device 6130 may correspond to the memory device 150 described with reference to FIGS. 1 to 7.

Thus, the memory controller 6120 may include a RAM, a processor, a host interface, a memory interface and an error correction component. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices, particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may be so integrated to form a solid state driver (SSD). Also, the memory controller 6120 and the memory device 6130 may be so integrated to form a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC), and/or a universal flash storage (UFS).

Figure 9:
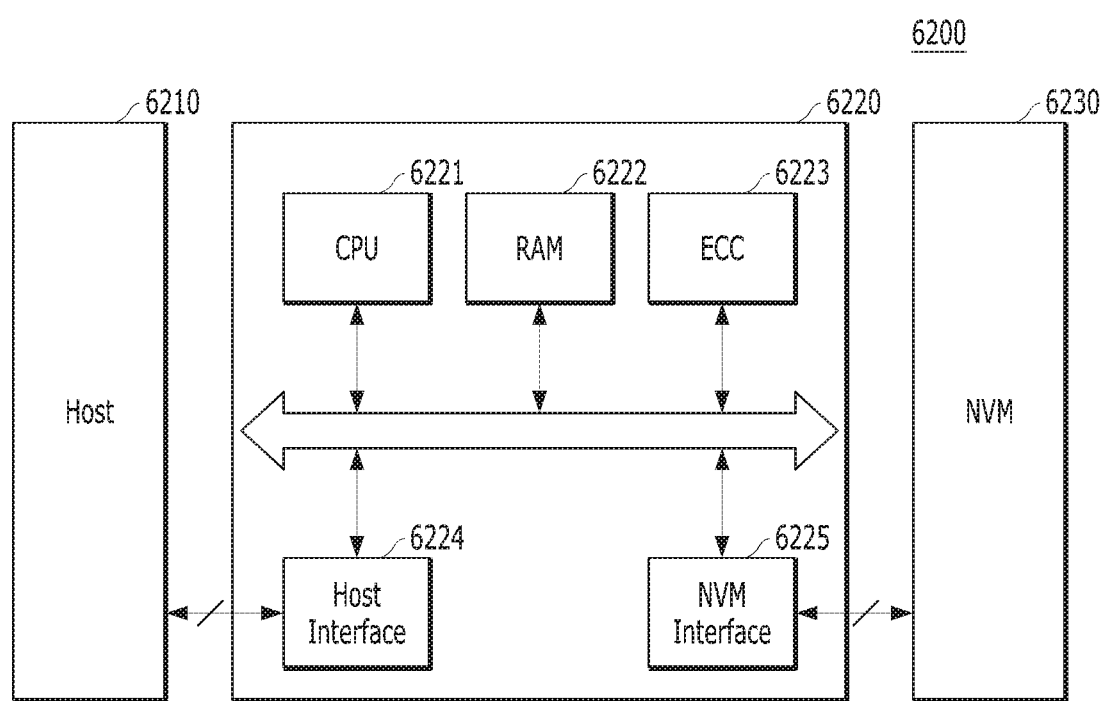

FIG. 9 is a diagram schematically illustrating another example of the data processing system including a memory system in accordance with an embodiment.

Referring to FIG. 9, the data processing system 6200 may include a memory device 6230 having one or more nonvolatile memories and a memory controller 6220 for controlling the memory device 6230. The data processing system 6200 illustrated in FIG. 9 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 7, and the memory controller 6220 may correspond to the controller 130 in the memory system 110 described in FIGS. 1 to 7.

The memory controller 6220 may control a read, write, or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control the operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. in this case, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit to, or receive from, the host 6210 data or signals through the host interface 6224, and may transmit to, or receive from, the memory device 6230 data or signals through the NUM interface 6225. The host interface 6224 may be connected to the host 6210 through a PATA bus, a SATA bus, a SCSI, an USB, a PCIe, or a NAND interface. The memory controller 6220 may have a wireless communication function with a mobile communication protocol such as WiFi or Long Term Evolution (LTE). The memory controller 6220 may be connected to an external device, e.g., the host 6210, or another external device, and then transmit/receive data to/from the external device. As the memory controller 6220 is configured to communicate with the external device through one or more of various communication protocols, the memory system and the data processing system in accordance with an embodiment may be applied to wired/wireless electronic devices, particularly a mobile electronic device.

Figure 10:
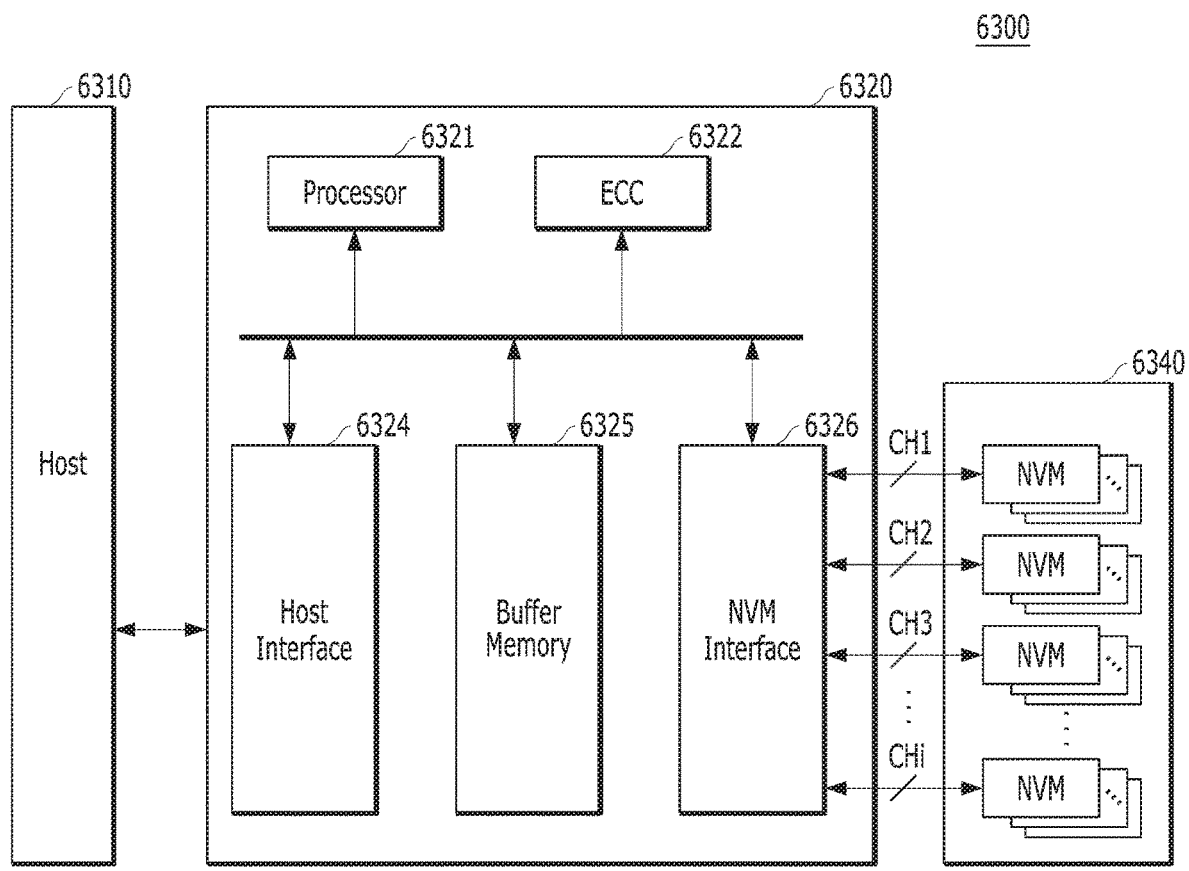

FIG. 10 is a diagram schematically illustrating another example of the data processing system including the memory system in accordance with an embodiment. FIG. 10 schematically illustrates an SSD to which the memory system may be applied.

Referring to FIG. 10, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as a DRAM, an SDRAM, a DDR SDRAM, an LPDDR SDRAM and a GRAM or nonvolatile memories such as an FRAM, a ReRAM, a STT-MRAM and a PRAM. FIG. 10 illustrates that the buffer memory 6325 exists in the controller 6320, but the buffer memory 6325 may be located or arranged external to the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, i.e., RAID level information of the write command provided from the host 6310 in the SSDs 6300, and may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 11:
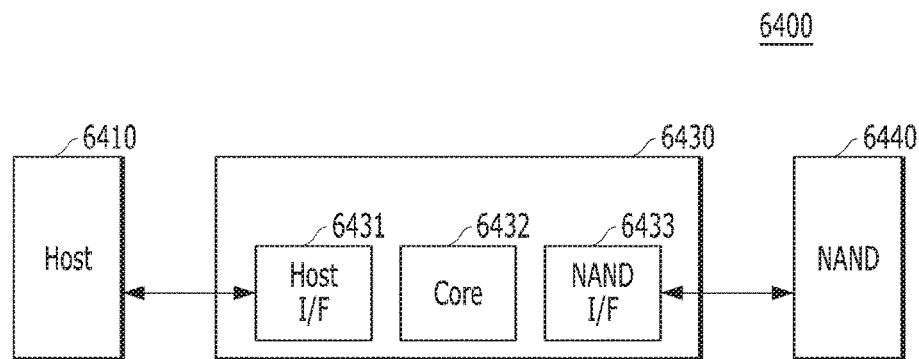
Figure 12:
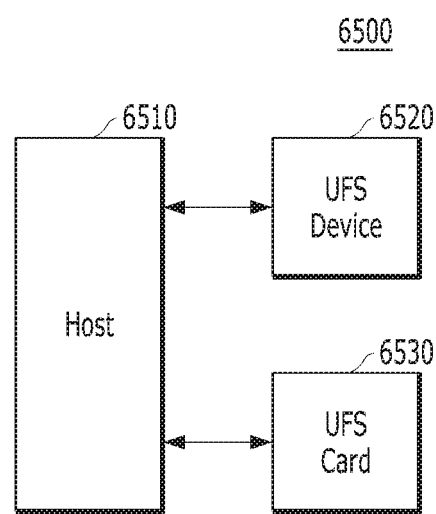
Figure 13:
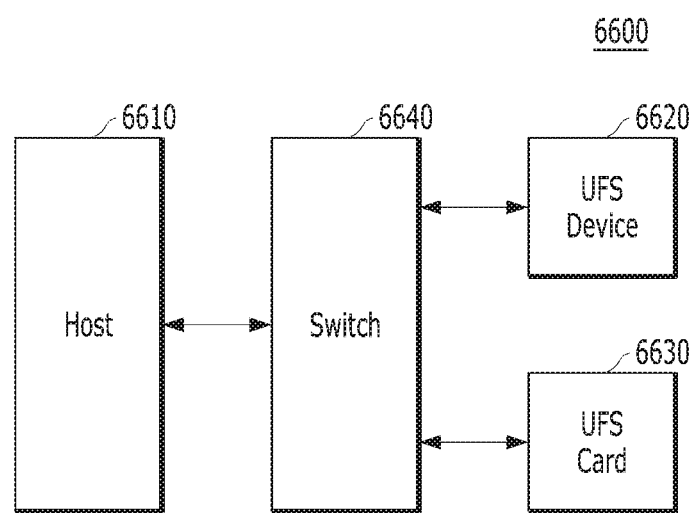
Figure 14:
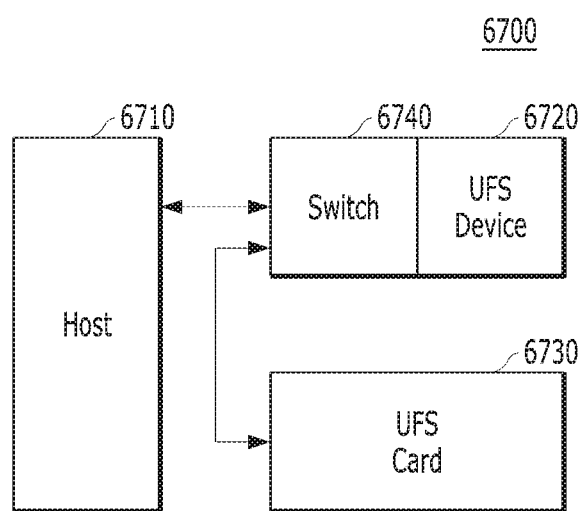
Figure 15:
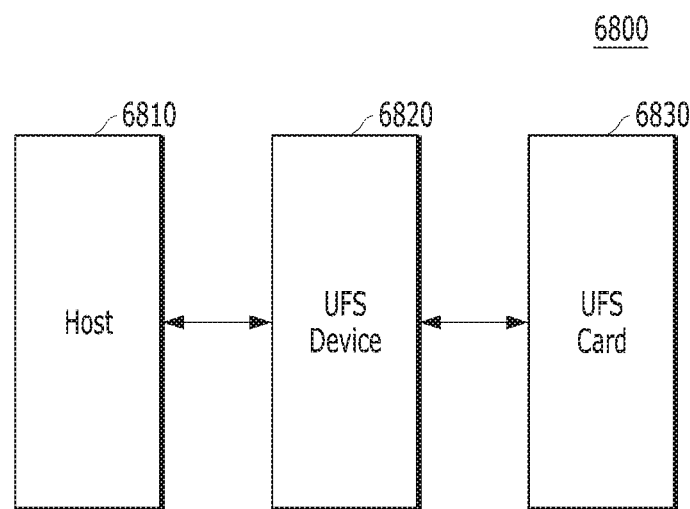

FIG. 11 is a diagram schematically illustrating another example of the data processing system including the memory system in accordance with an embodiment. FIG. 11 schematically illustrates an embedded Mufti-Media Card (eMMC) to which the memory system may be applied.

Referring to FIG. 11, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control the operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 12 to 15 are diagrams schematically illustrating other examples of the data processing system including the memory system in accordance with embodiments. FIGS. 12 to 15 schematically illustrate UFS (Universal Flash Storage) systems to which the memory system may be applied.

Referring to FIGS. 12 to 15, the UFS systems 6500, 6600, 6700 and 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700 and 6800 may communicate with external devices, e.g., wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 9 to 11, and the UFS cards 6530, 6630, 6730, 6830 may be embodied in the form of the memory card system 6100 described with reference to FIG. 8.

Furthermore, in the UFS systems 6500, 6600, 6700 and 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, e.g., UFDs, MMC, SD, mini-SD, and micro-SD.

Figure 16:
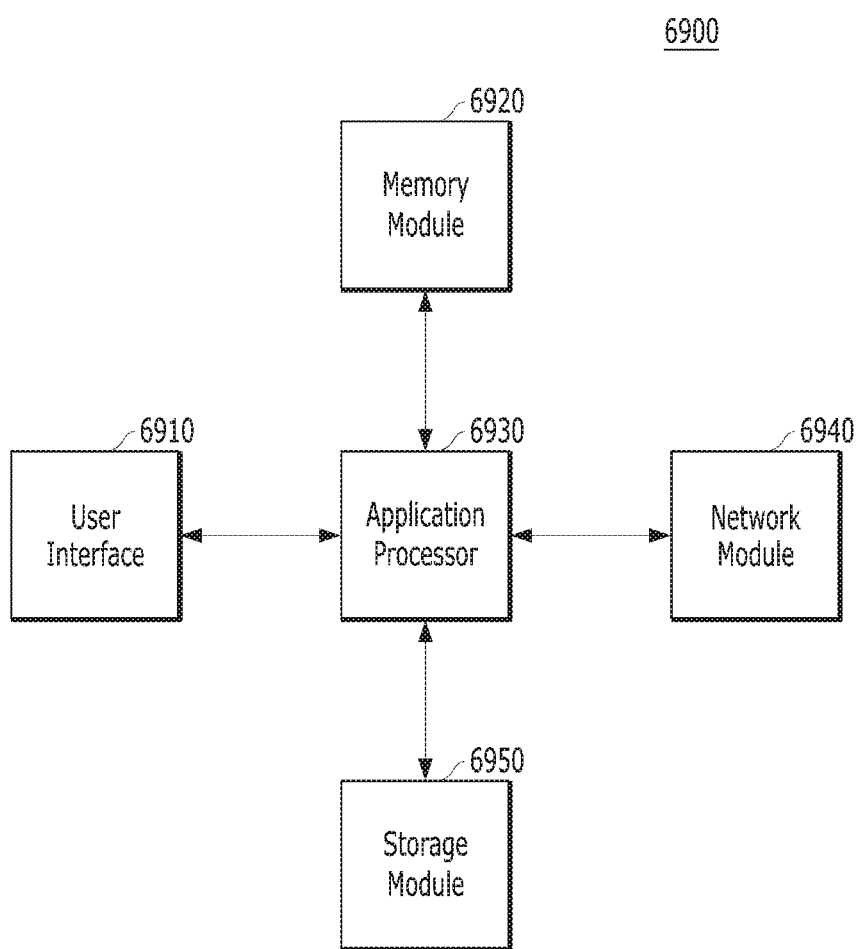

FIG. 16 is a diagram schematically illustrating another example of the data processing system including the memory system in accordance with an embodiment. FIG. 16 is a diagram schematically illustrating a user system to which the memory system may be applied.

Referring to FIG. 16, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 10 to 15.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control the operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present invention has been described with respect to specific embodiments, it will be apparent to those skilled in the art that various changes and modifications may be made without departing from the spirit and scope of the invention as defined in the following claims.

What is claimed is:

1. A controller, comprising:
   a processor suitable for controlling a memory device to write normal map data and sequential map data; and
   a map data manager suitable for generating and storing a normal map table and a sequential map table,
   wherein the map data manager, when normal user data is sequential user data, sequentially records the normal map data in the normal map table, merges the normal map data in units, each of a size of a write segment, to generate the sequential map data when a size of the recorded normal map data is greater than the size of the write segment, and records the sequential map data in the sequential map table, and
   wherein the normal map table represents a mapping relationship between the normal user data and the normal map data corresponding to the normal user data, and the sequential map table represents a mapping relationship between the sequential user data and the sequential map data corresponding to the sequential user data.

2. The controller of claim 1, wherein, when an updating operation is to be performed on at least one target normal map data of a plurality of normal map data included in the sequential map data, the map data manager divides the sequential map data, records each of the normal map data included in the sequential map data into the normal map table, and updates the target normal map data.

3. The controller of claim 1, wherein the map data manager includes a plurality of sequential map tables in which the normal map data are merged in units of different write segment sizes to generate and record the sequential map data.

4. The controller of claim 1, wherein the map data manager stores a segment table in which a normal write segment and a sequential write segment are recoded to correspond to the normal map table and the sequential map table, respectively.

5. The controller of claim 4, wherein the normal write segment and the sequential write segment correspond to a plurality of normal read segments and a plurality of sequential read segment, respectively.

6. The controller of claim 5, wherein, when target read data is sequential data, the map data manager searches the sequential write segment recorded in the segment table and the sequential map table corresponding to the sequential write segment, and subsequently loads the sequential read segment corresponding to the sequential write segment and including the target read data, and controls the memory device to read the target read data based on the sequential read segment.

7. The controller of claim 5, wherein, when target read data is not sequential data,
   the map data manager searches the normal write segment recorded in the segment table and the normal map table corresponding to the normal write segment, and
   the processor loads the normal read segment corresponding to the normal write segment and including the target read data, and controls the memory device to read the target read data based on the normal read segment.

8. The controller of claim 1, wherein, when the normal user data is random user data, the map data manager records the normal map data in the normal map table.

9. The controller of claim 1, wherein, when a size of the normal user data is smaller than the size of the write segment, the map data manager receives normal user data to be processed next.

10. An operating method of a controller, the operating method comprising:
    controlling a memory device to write a normal map data and a sequential map data to the memory device; and
    managing a normal map table and a sequential map table,
    wherein, when normal user data is sequential user data,
       the managing of the normal map table and the sequential map table comprises:
         sequentially recording normal map data in the normal map table;
         merging the normal map data in units, each of a size of a write segment, to generate sequential map data when a size of the recorded normal map data is greater than the size of the write segment; and
         recording the sequential map data in the sequential map table,
       wherein the normal map table represents a mapping relationship between the normal user data and the normal map data corresponding to the normal user data, and the sequential map table represents a mapping relationship between the sequential user data and the sequential map data corresponding to the sequential user data.

11. The operating method of claim 10, wherein the managing of the normal map table and the sequential map table further comprises:
    dividing the sequential map data,
    recording each of the normal map data included in the sequential map data into the normal map table, and updating target normal map data when an updating operation is to be performed on at least one target normal map data of a plurality of normal map data included in the sequential map data.

12. The operating method of claim 10, wherein the controller includes a plurality of sequential map tables in which the normal map data are merged in units of different write segment sizes to generate and record the sequential map data.

13. The operating method of claim 10, wherein the managing of the normal map table and the sequential map table further comprises:
    storing a segment table in which a normal write segment and a sequential write segment are recoded to correspond to the normal map table and the sequential map table, respectively.

14. The operating method of claim 13, wherein the normal write segment and the sequential write segment correspond to a plurality of normal read segments and a plurality of sequential read segment, respectively.

15. The operating method of claim 14, wherein the managing of the normal map table and the sequential map table further comprises:
    when target read data is sequential data,
    searching the sequential write segment recorded in the segment table and the sequential map table corresponding to the sequential write segment, and loading the sequential read segment corresponding to the sequential write segment and including the target read data, and
    wherein the memory device is controlled to read the target read data based on the sequential read segment.

16. The operating method of claim 14, wherein the managing of the normal map table and the sequential map table further comprises:
    when target read data is not sequential data,
    searching the normal write segment recorded in the segment table and the normal map table corresponding to the normal write segment, and subsequently loading the normal read segment corresponding to the normal write segment and including the target read data, and wherein the memory device is controlled to read the target read data based on the normal read segment.

17. The operating method of claim 10, wherein the managing of the normal map table and the sequential map table further comprises:
    recording the normal map data in the normal map table when the normal user data is random user data.

18. The operating method of claim 10, wherein the managing of the normal map table and the sequential map table further comprises:
    receiving normal user data to be processed next when a size of the normal user data is smaller than the size of the write segment.

19. A controller, comprising:
    a processor; and
    a map data manager suitable for operating with the processor to generate and store normal user data in association with corresponding normal map data, and generating and storing sequential user data in association with corresponding sequential map data,
    wherein the map data manager identifies normal map data that is sequential, and merges the sequential normal map data in units, each of a size of a write segment, to generate the sequential map data, when a size of the recorded normal map data is greater than the size of the write segment.

* * * * *